Figure 1:
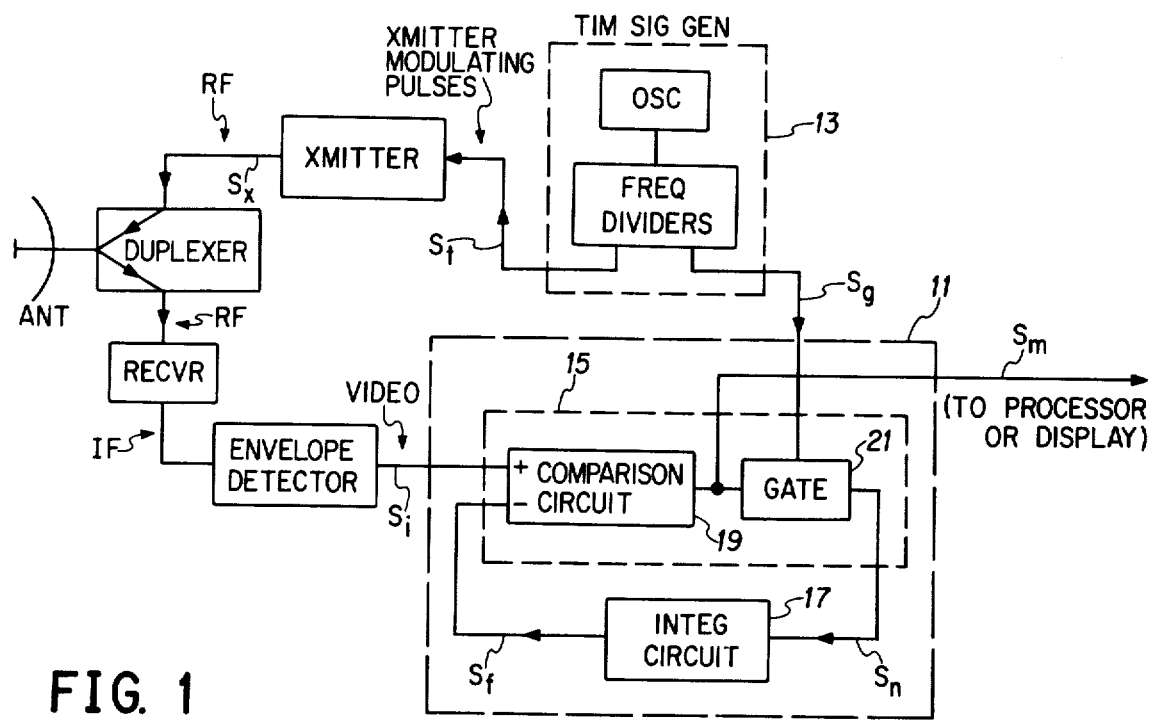

# United States Patent [19]

Hooker, Jr.

[11] 4,051,473
[45] Sept. 27, 1977

[54] INPUT TRACKING THRESHOLD DETECTOR

[75] Inventor: Marvin L. Hooker, Jr., Marion, Iowa

[73] Assignee: Rockwell International Corporation, El Segundo, Calif.

[21] Appl. No.: 727,112

[22] Filed: Sept. 27, 1976

[51] Int. Cl.² ............................................. G01S 7/34
[52] U.S. Cl. ................................... 343/7 A; 307/359; 328/149
[58] Field of Search ................. 343/7 A; 307/359; 328/115, 146, 149

[56] References Cited

U.S. PATENT DOCUMENTS

| 3,374,479 | 3/1968 | Moore | 343/7 A |
| 3,380,018 | 4/1968 | Littrell et al. | 343/7 A X |
| 3,665,326 | 5/1972 | Sullivan | 307/359 X |
| 3,737,790 | 6/1973 | Brown | 307/359 X |

*Primary Examiner*—T.H. Tubbesing
*Attorney, Agent, or Firm*—Terry M. Blackwood; Robert J. Crawford; L. Lee Humphries

[57] ABSTRACT

An input tracking threshold detector includes a first circuit receiving input signal, a feedback signal, and a predetermined gating signal. The first circuit outputs a binary signal which during gating signal enablement intervals is indicative of the relative amplitudes of the input and feedback signals. The feedback signal is developed from the first circuit output by a second circuit whose output signal amplitude is indicative of the duty cycle of its input.

14 Claims, 5 Drawing Figures

INPUT TRACKING THRESHOLD DETECTOR

This invention generally relates to electronics and to signal detection. More particularly, in its presently preferred application, this invention relates to a noise tracking threshold detector for a radar system.

In radar systems the optimum detection of the radar signal is achieved when the threshold of detection is adjusted such that only a few noise blips appear on the radar display. When the threshold is adjusted lower, noise floods the display obscuring and making indistinguishable any real targets which may be present. When the threshold is adjusted higher, smaller real targets may go undetected and fail to show up on the display. Since the probability of false alarm P and the threshold to noise ratio R are exponentially related (i.e., $P=E^R$), a variation of a few tenths of a decibel in either the threshold lever or receiver gain causes an objectionable change in the number of noise blips displayed. In order to maintain maximum sensitivity during variations in receiver gain, voltage, and bandwidth, a noise tracking threshold circuit is frequently used to control the threshold level. Previous tracking circuits have been of the analog filter type wherein a long time constant low-pass filter extracts the average value of the receiver noise. This amplitude is then scaled to provide the necessary threshold level to maintain the desired number of noise blips on the display. This type of circuit can compensate for variations in receiver gain or voltages by adjusting the threshold accordingly. However, this type of circuit cannot compensate for bandwidth or detector variations and noise distribution changes. Because the circuit cannot compensate for these variations, the maximum sensitivity is not achieved and the system performance is degraded due to environmental conditions and/or aging.

In accordance with the present invention there is featured a noise tracking threshold detector which compensates for variations due to voltage shift, gain, bandwidth, noise characteristics, and/or noise distribution.

Figure 2:
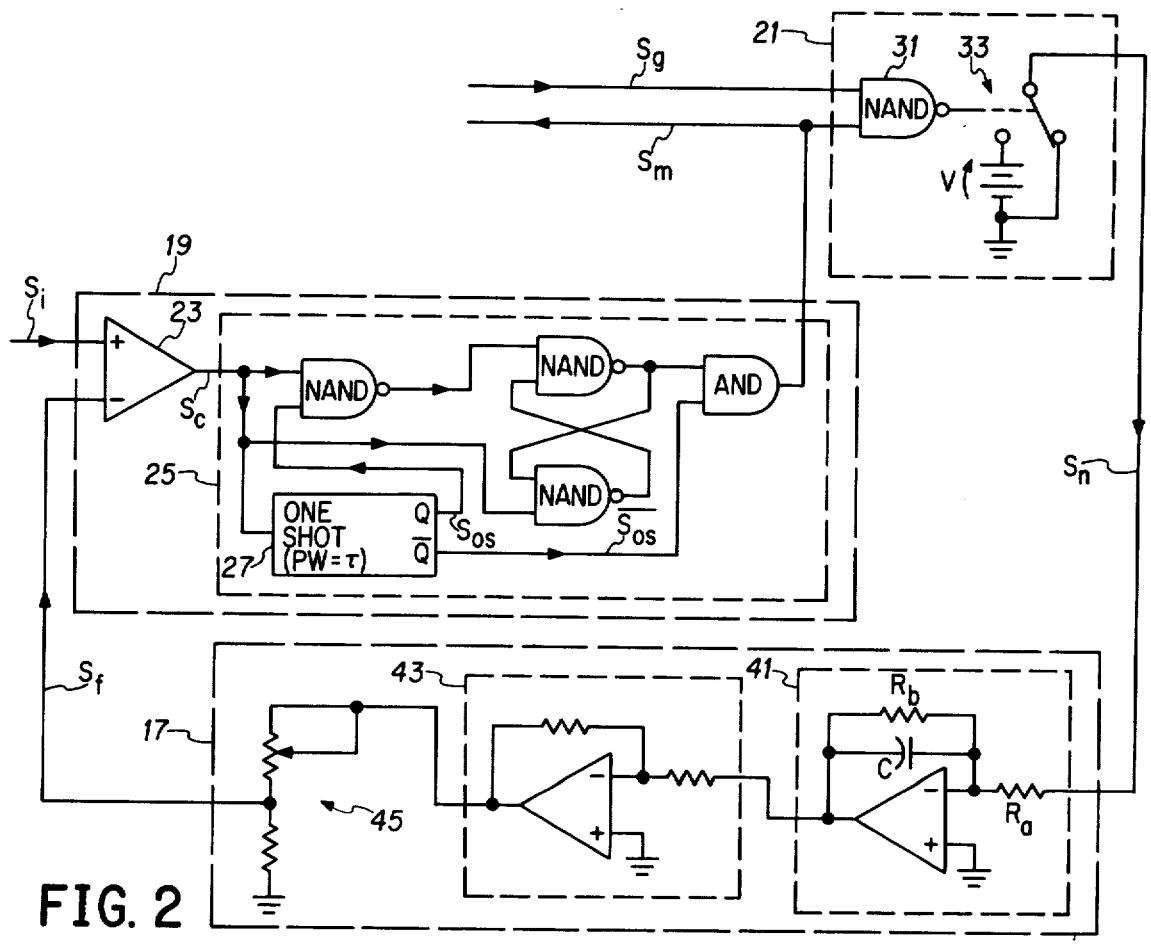
Figure 3:
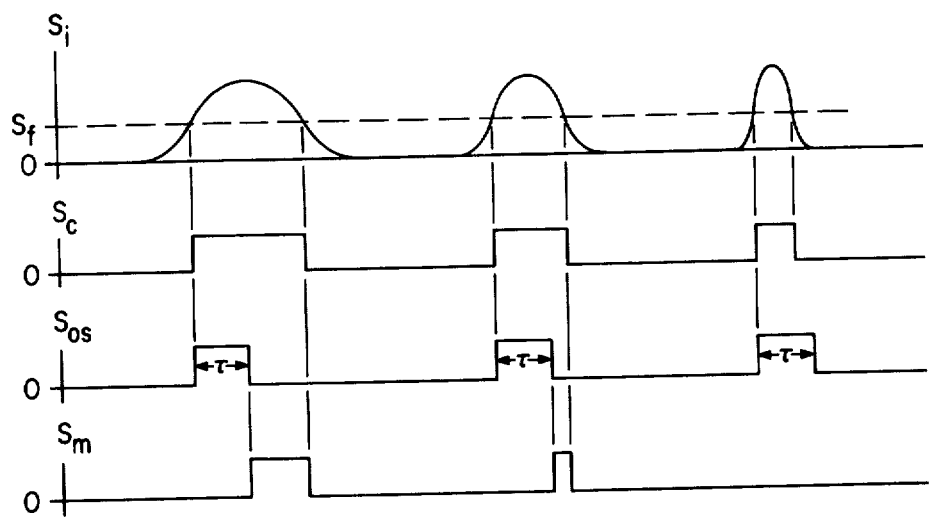
Figure 5:
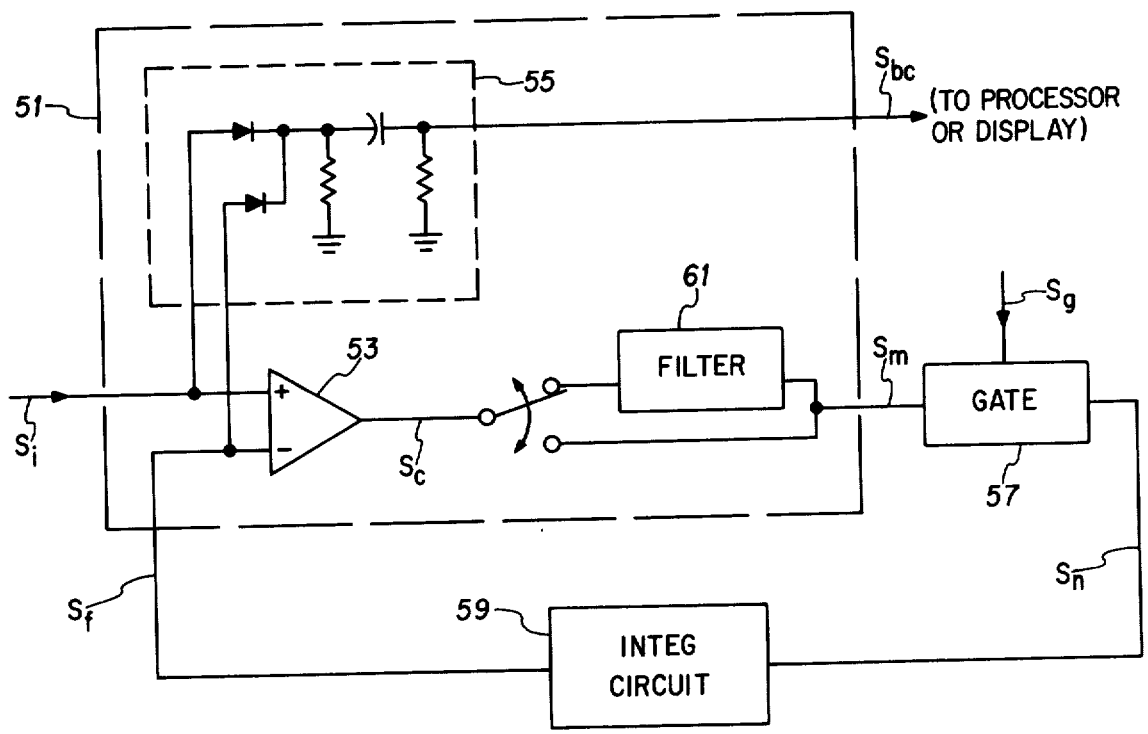
Figure 4:
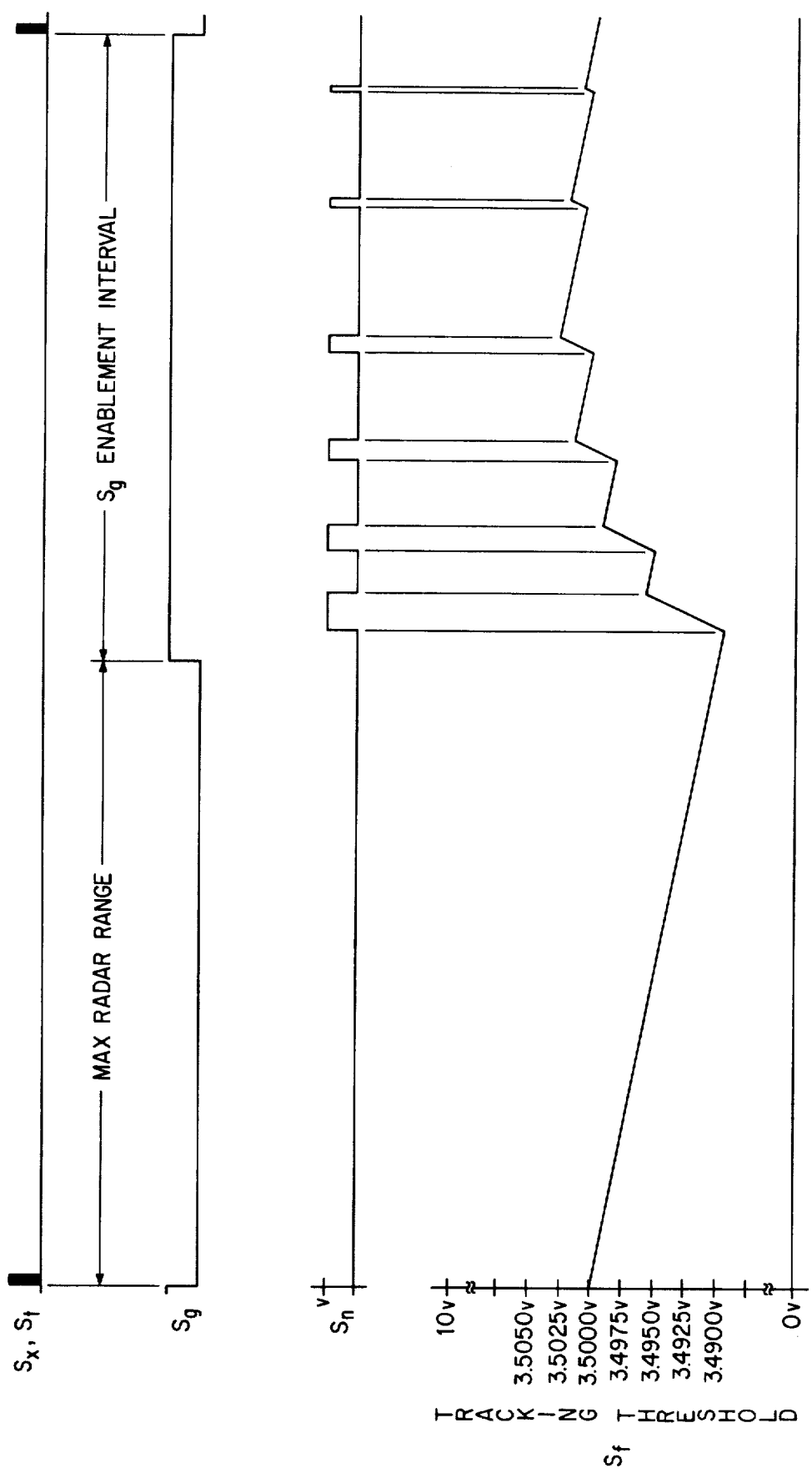

These and other features, objects and advantages of the invention will become more apparent upon reference to the following specification, claims, and appended drawings in which:

FIG. 1 is a block circuit diagram illustrating the presently preferred embodiment and application, FIG. 2 is a circuit diagram illustrating item 11 of FIG. 1 in more detail, FIGS. 3 and 4 show waveforms useful in explaining the operation of the apparatus of FIGS. 1 and 2, and FIG. 5 is a circuit diagram illustrating an alternative implementation of item 11 of FIG. 1.

In the preferred embodiment illustrated in FIG. 1, threshold detector 11 receives video signal $S_i$ produced by the envelope detection of the receiver IF output. Threshold detector 11 also receives a gating signal $S_g$ which has predetermined enablement intervals. Timing signal generator 13, which comprises conventional frequency dividers driven by a conventional master oscillator, generates $S_g$ and the transmitter modulating pulse signal $S_t$. $S_g$ and $S_t$ are appropriately synchronized with one another.

Threshold detector 11 comprises a gated output comparison circuit 15 and an integrating circuit 17. Circuit 15, which receives $S_n$, the integrator output signal $S_f$, and the gating signal $S_g$, outputs a two-level or binary signal $S_n$ which during $S_g$ enablement intervals alternates between two levels as a function of the relative amplitudes of $S_i$ and $S_f$. Circuit 17, from $S_n$, produces $S_f$ whose amplitude depends on the ratio of $S_n$ first level time to $S_n$ second level time, i.e., the duty cycle of $S_n$. Signal $S_m$, the non-gated output of comparison circuit 19, contains the radar return information and may be subjected to further signal processing downstream, or if so desired, $S_m$ may be used directly to provide Z-axis modulation for a CRT display. It should here be pointed out that as presently employed $S_m$ is one of 3 binary signals which together represent $S_i$ in digitized form, and more particularly quantize $S_i$ into 4 levels. These 3 binary signals are further processed in a digital processor which is the subject of my U.S. Patent application Ser. No. 720,165 entitled "Radar Signal Processor," filed Sept. 2, 1976. To develop the other two binary signals, $S_i$ is also fed to two non-tracking, comparator-type threshold detectors (not shown) having different threshold levels, both being higher than $S_f$. In other words, the tracking threshold detector herein is presently employed only on the signal closest to the noise.

Turning now to FIG. 2 which shows threshold detector 11 in more detail, the comparison circuit 19 is seen to comprise a differential input operational amplifier 23 followed by a digital filter 25. Op-amp 23 operated as a unipolar output comparator so as to produce a signal $S_c$ which is a logic "1" when $S_i > S_f$ and a logic of "0" when $S_i < S_f$. Digital filter 25 includes a one-shot 27 which when triggered by the op-amp output signal $S_c$ outputs at Q a logic "1" pulse and at $\overline{Q}$ a logic "0" pulse, each of width $\tau$. $S_c$ and the one-shot output signals $S_{os}$ and $\overline{S}_{os}$ are appropriately logically combined to produce a signal $S_m$ which is a logic "1" only during periods when $S_c$ and $S_{os}$ are simultaneously logic "1" and logic "0" respectively. Otherwise $S_m$ is a logic "0". The operation of comparison circuit 19 is graphically set forth in FIG. 3 which for purposes of illustration assumes a constant $S_f$ level. As is also apparent from FIG. 3, filter 25 is a low-pass filter and prevents contribution by $S_i$ to $S_m$ unless $S_i$ exceeds $S_f$ for at least a time slightly greater than $\tau$. That is, filter 25 prevents the frequency components in $S_i$ which exceed approximately $(1/\tau)$ Hz from contributing to $S_m$, $S_n$, and thus $S_f$. It is presently preferred that $\tau$ be about one half the transmitted pulse width and thus for present embodiments $\tau$ is approximately 3 microseconds.

Gate 21 comprises a NAND gate 31 and a switch 33. NAND gate 31 receives $S_m$ and $S_g$ and drives switch 33 between V volts and ground. Switch 33 ensures that in the gate output signal $S_n$, a logic "0" always corresponds to 0 volts and a logic "1" always corresponds to a constant V volts, and thus ensures, as will become more apparent hereinbelow, that the charge and discharge rates of integrating circuit 17 remain constant. Switch 33 may be variously embodied and presently comprises a conventional transistor switch.

Integrating circuit 17 comprises an op-amp type integrator 41, a buffer amplifier 43 and an output attenuation network 45. The op-amp integrator 41 is connected to produce different rise and fall rates in $S_f$, the rise rate depending on the value of $R_a \times C$, and the fall rate depending on the value of $R_b \times C$. In the present embodiment $R_a$, $R_b$, and C are approximately 22 kilohms, 1 megohm, and 1 microfarad respectively. Buffer amplifier 43 provides load isolation and attenuator network 45 provides a level or gain adjustment of the feedback signal $S_f$.

The waveforms of FIG. 4 further illustrate the operation of threshold detector 11. As seen therefrom, each $S_g$ enablement interval is delayed from the preceding transmitted pulse by at least a time interval corresponding to the maximum radar range. Furthermore, each $S_g$ enablement interval is ended before or at the succeeding transmitter pulse. In other words, the $S_g$ enablement intervals are controlled to occur during time intervals in which it is expected that $S_i$ will contain only noise. For the present system, the time interval corresponding to maximum radar range is approximately $1/(2xPRF)$ (or 5 milliseconds since PRF is approximately 100Hz) and each $S_g$ enablement interval occupies approximately the last one half (or last 5 milliseconds) of each pulse repetition period.

Prior to the $S_g$ enablement intervals, $S_n$ is forced to its zero volt or ground level, and the output signal $S_f$ of integrating circuit 17 decays from an initial and previously attained value according to a predetermined slope or rate $K_1$. During enablement intervals, $S_n$ is substantially a duplicate of $S_m$ and alternates between ground and V volts as $S_m$ alternates between logic 0 and logic 1. During each V-level occurrence of $S_m$, $S_f$ increases from its last preceding level according to a predetermined rate $K_2$, where $K_2 > K_1$. At the end of a V-level occurrence, $S_f$ resumes its decay according to $K_1$. Thus since $S_f$ increases or decreases in accordance with the presence or absence of the $S_n$ V-level, the initial $S_f$ level at the beginning of any transmitter pulse repetition period is an indication of $S_n$ duty cycle recently prior to such time and during such pulse period $S_f$ automatically updates or adjusts itself according to the $S_n$ duty cycle for such pulse repetition period. Being automatically adjusted according to the $S_n$ duty cycle and being fed back to comparison circuit 19, $S_f$ acts to maintain the $S_n$ duty cycle constant. If as expected $S_n$ is indicative of noise only, then the threshold to noise ratio remains virtually constant even though noise level fluctuates, the noise on $S_m$ per unit time remains virtually constant, and optimum sensitivity is maintained. Even in the presence of interfering signals, sensitivity is improved relative to prior art tracking detectors because, as is explained below, the amplitude of the $S_i$ components has relatively little effect on the amplitude of the tracking threshold signal $S_f$.

It should here be noted that in the present embodiment $S_f$ may range from 0 volts to about 10 volts. Typically however, after $S_f$ has had a chance to adjust to a relatively stable noise environment, swings in $S_f$ per pulse repetition period of about 20 to 30 millivolts are representative. One such representative case was chosen for the illustration of $S_f$ in FIG. 4. Therein the $S_f$ amplitude scale is interrupted and a portion thereof illustrated in a magnified manner for clarity. Also, in the preferred embodiment, the RC network 41 is adjusted to provide an $S_f$ rise rate (i.e., $K_2$) of about 20 volts per second and an $S_f$ decay rate (i.e., $K_1$) of about 3 to 4 volts per second.

When a tracking threshold detector constructed in accordance with the description hereinabove was used in the present radar system in place of the prior art analog type tracking detector, tests demonstrated an increase in sensitivity of about 2dB. The primary reason for such improvement is considered due to the present tracking detector's decreased dependence on the amplitude of the noise. More particularly, large noise bursts or interfering signals greatly influence the analog type tracking circuits because of their large amplitude. The tracking circuit herein is virtually immune to signal amplitude because it only detects that a pulse was present for a certain duration and discards the amplitude information. In other words the input to integrating circuit 17 is always a binary signal regardless of the noise content and/or distribution in $S_i$. Such signal "normalization" before application to the integrator minimizes the effect of amplitude. For instance, one pulse out of several hundred pulses all of the same amplitude has virtually no effect when compared to one very large pulse out of several hundred small pulses.

It should now be apparent that various modifications of the FIG. 2 apparatus are possible and may indeed be desirable depending upon the particular application, using system, and/or signal environment. For instance, low-pass filter 25 may be omitted and replaced with a short circuit such that all frequency components in $S_i$ contribute to $S_m$, $S_n$, and $S_f$. Also, a band-pass, band-reject, or high-pass filter characteristic, and the ability to select a particular characteristic, might be desirable.

It may also be desirable in some instances, such as a strictly analog-type radar system, to retain the basic video signal shape following threshold detection. That is, it may be desirable in some instances for the signal fed downstream for further processing or display to merely be a bottom clipped version of $S_i$. In such an instance, a modification of FIG. 2 according or similar to FIG. 5 could be employed. In FIG. 5 the comparison circuit 51 includes an op-amp comparator 53 similar to item 23 in FIG. 2 and further includes a bottom clipper 55. $S_{bc}$ retains the $S_i$ amplitude information which exceeds $S_f$. In FIG. 5, gate 57 and integrating circuit 59 may be the same as FIG. 2 items 21 and 17 respectively. A digital filter 61 at the output of op-amp comparator 53 may selectably be inserted or bypassed as so desired.

Thus while particular embodiments of the present invention have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. In a radar system including receiver means, and detector means for providing a video signal $S_i$ from the receiver means output, the improvement comprising, in combination, first means for generating a gating signal $S_g$ having enablement intervals occurring in a predetermined time relation to the transmitted signal, second means for receiving $S_i$, $S_g$, and a feedback signal $S_f$, and outputting a signal $S_n$ which, during the $S_g$ enablement intervals, is a binary signal indicative of the relative amplitudes of $S_i$ and $S_f$, and third means for receiving $S_n$ and outputting the signal $S_f$, $S_f$ being indicative of the duty cycle of $S_n$.

2. The radar system as defined in claim 1 wherein said first means comprises means for producing the $S_g$ enablement intervals at times during which it is expected that $S_i$ will contain only noise.

3. The radar system as defined in claim 2 wherein said second means includes filter means connected for preventing contribution to $S_n$ by predetermined frequency components of $S_i$.

4. The radar system as defined in claim 2 wherein said second means includes signal amplitude comparison means and gating means.

5. The radar system as defined in claim 2 wherein said third means comprises integrating means.

6. The radar system as defined in claim 4 wherein said signal amplitude comparison means comprises means for providing a binary signal output.

7. The radar system as defined in claim 6 wherein said signal amplitude comparison means includes digital filter means connected for preventing contribution to $S_n$ by predetermined frequency components of $S_i$.

8. The radar system as defined in claim 7 wherein said filter means comprises low pass filter means.

9. An input signal tracking threshold detector comprising:
  a. first circuit means for receiving (i) the input signal, $S_i$, (ii) a feedback signal, $S_f$, and (iii) a predetermined gating signal, $S_g$, and outputting a signal $S_n$ which, during enablement intervals as controlled by $S_g$, is a binary signal indicative of the relative amplitudes of $S_i$ and $S_f$, and
  b. second circuit means for receiving $S_n$ and outputting the signal $S_f$, $S_f$ being indicative of the duty cycle of $S_n$.

10. The detector as defined in claim 9 wherein said first circuit means includes filter means connected for preventing contribution to $S_n$ by predetermined frequency components of $S_i$.

11. The detector as defined in claim 9 wherein said first circuit means includes signal amplitude comparison means connected for receiving $S_i$ and $S_f$ and gating means connected for receiving $S_g$.

12. The detector as defined in claim 11 wherein said second circuit means comprises integrating means.

13. The detector as defined in claim 11 wherein said signal amplitude comparison means comprises means for providing a binary signal output.

14. The detector as defined in claim 13 wherein said signal amplitude comparison means includes digital filter means connected for preventing contribution to $S_n$ by predetermined frequency components of $S_i$.

* * * * *